(12) United States Patent
Matsuura et al.

(10) Patent No.: US 7,145,403 B2
(45) Date of Patent: Dec. 5, 2006

(54) STATIC MAGNETIC FIELD APPLYING STRUCTURE FOR USE IN ATOMIC OSCILLATOR

(75) Inventors: Hideyuki Matsuura, Sapporo (JP); Akira Kikuchi, Sapporo (JP); Ken Atsumi, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 10/830,900

(22) Filed: Apr. 23, 2004

(65) Prior Publication Data

US 2005/0128014 A1 Jun. 16, 2005

(30) Foreign Application Priority Data

Dec. 11, 2003 (JP) .............................. 2003-413567

(51) Int. Cl.
- *H03L 7/26* (2006.01)
- *H01S 1/06* (2006.01)
- *H03B 17/00* (2006.01)

(52) U.S. Cl. .......................................... 331/94.1; 331/3
(58) Field of Classification Search .................... 331/3, 331/94.1; 315/111.41, 111.51, 111.61, 111.71
See application file for complete search history.

(56) References Cited

U.S. PATENT DOCUMENTS

| | | | | |
|---|---|---|---|---|
| 3,443,208 A | * | 5/1969 | Ruddock et al. | 324/304 |
| 3,495,161 A | * | 2/1970 | Bell | 324/304 |
| 3,496,488 A | * | 2/1970 | Fork et al. | 372/32 |
| 5,146,137 A | * | 9/1992 | Gesche et al. | 315/111.21 |
| 5,712,597 A | * | 1/1998 | Atsumi et al. | 331/94.1 |
| 5,751,193 A | * | 5/1998 | Nakajima et al. | 331/3 |
| 6,137,237 A | * | 10/2000 | MacLennan et al. | 315/248 |
| 2003/0205680 A1 | * | 11/2003 | Benveniste et al. | 250/423 R |
| 2005/0212607 A1 | * | 9/2005 | Happer et al. | 331/94.1 |

FOREIGN PATENT DOCUMENTS

| | | |
|---|---|---|
| JP | 61-100049 | 6/1986 |
| JP | 6334520 | 12/1994 |

* cited by examiner

*Primary Examiner*—Robert Pascal
*Assistant Examiner*—James Goodley
(74) *Attorney, Agent, or Firm*—Katten Muchin Rosenman LLP

(57) ABSTRACT

The present invention relates to a static magnetic field applying structure for use in an atomic oscillator in which plural sets of magnetic field generating means are provided with spacing interposed among them, and a resonance cell is disposed in a space between the magnetic field generating means. The object of the present invention is to realize the static magnetic field applying structure which can be small-sized and produced at a low cost.

16 Claims, 10 Drawing Sheets

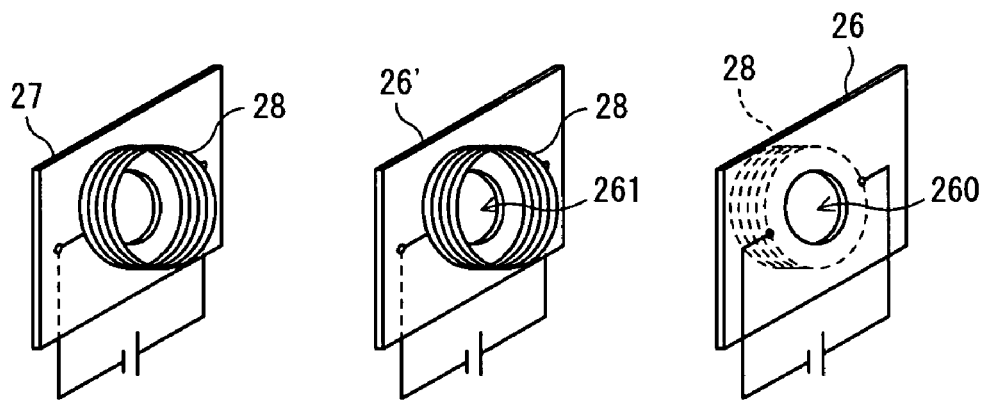
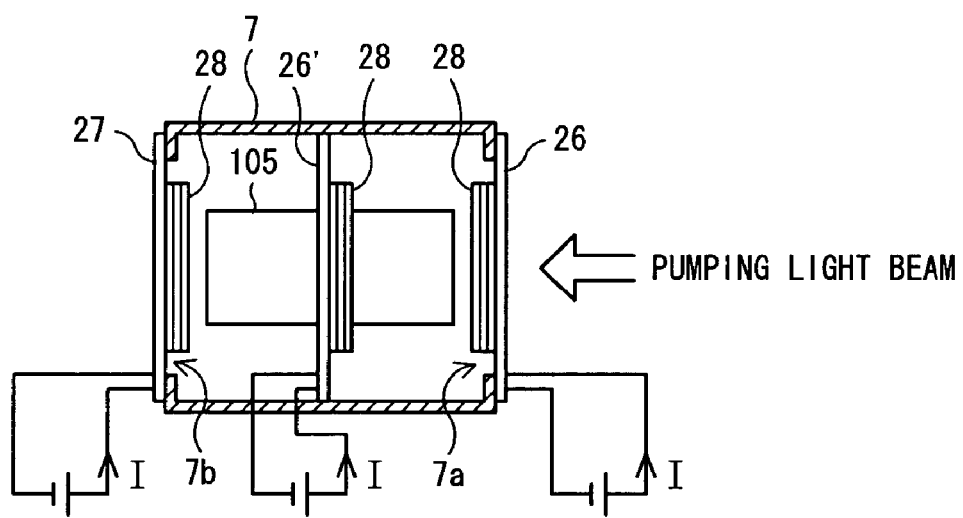

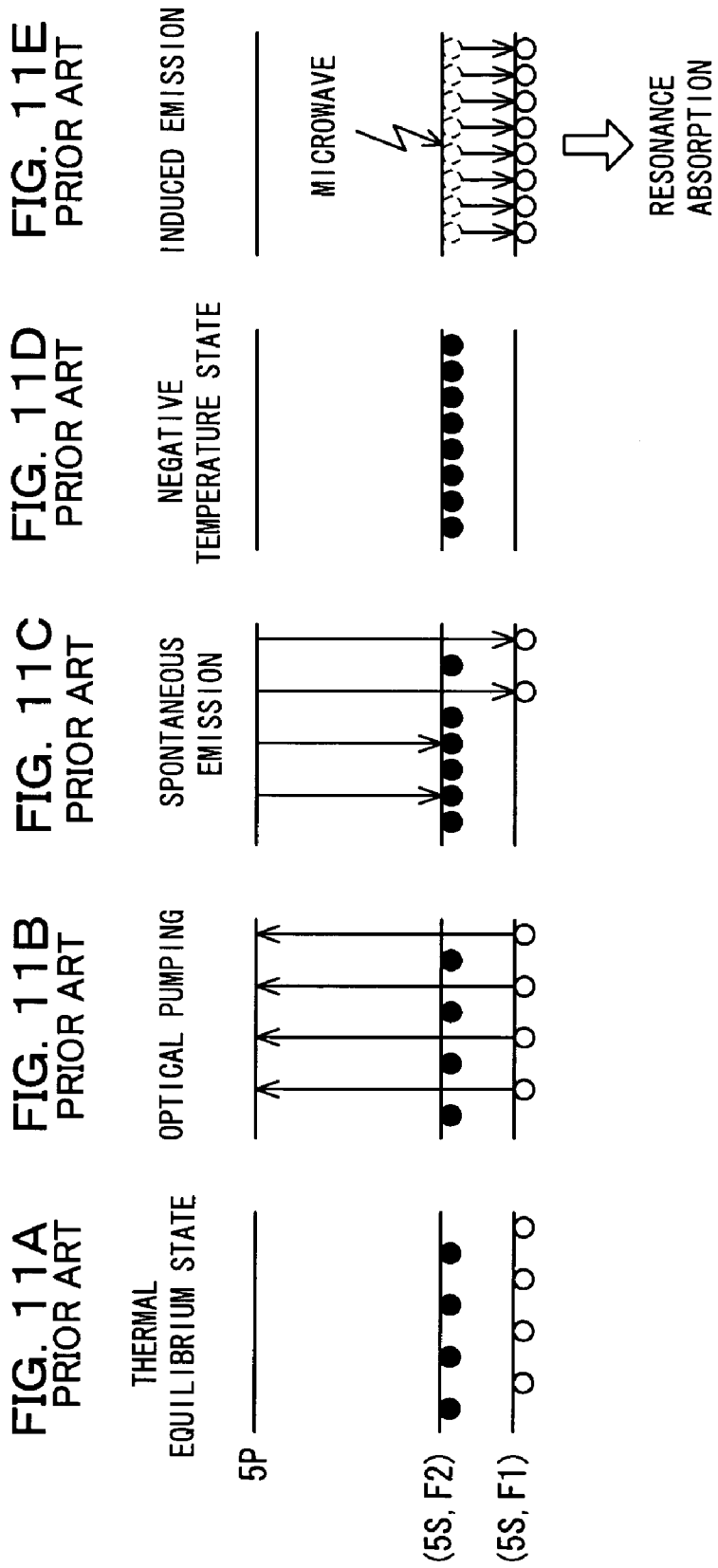

STATIC MAGNETIC FIELD APPLYING STRUCTURE FOR USE IN ATOMIC OSCILLATOR

BACKGROUND OF THE INVENTION (1) Field of the Invention

The present invention relates to a static magnetic filed applying structure for use in an atomic oscillator. In particular, the present invention relates to a structure for applying a static magnetic filed for use in an atomic oscillator of a passive-type based on a principle of optical pumping.

(2) Description of Related Art

Recently, the information communication network tends to move forward to a digital network construction, and with this tendency, it becomes indispensable to prepare a clock source which can provide a highly accurate and highly stable clock. A rubidium atom oscillator is drawing attention as the clock source, and it is requested to establish a way of small-sizing and low-cost production. In particular, the recent request is to establish a way of fabricating the oscillator having a thin body from a device-mounting standpoint.

How the atomic oscillator is made into a thin body depends on how an optical-microwave resonator can be miniaturized, and many manufacturing companies pay a lot of effort for devising a construction which makes it possible to small-sizing the microwave oscillator. Recent released report introduces a new method of study achievement. That is, the microwave resonator is obviated but a laser-light beam is subjected to a microwave modulation and this laser-light beam is effected to cause an atomic resonance (dark line resonance method). Thus various approaches have been made to establish a device small-sizing.

These methods stand on the same fundamental principle. That is, the atomic oscillator employs transition between energy levels in atomic ultra-micro structure. Therefore, it is necessary to keep an atom in a static magnetic field and cause Zeeman effect to divide the energy level. To this end, it is indispensable to provide a circuit for generating a static magnetic field. This is a critical development item for proceeding the small-sizing and the low-cost production in the later stage.

FIG. 10 is a diagram for explaining a function and a structure of a conventional rubidium atomic oscillator. In FIG. 10, reference numeral 101 represents a first magnetism shielding structure, 102 a second magnetism shielding structure, and 103 and 104 thermal insulating materials.

Further, reference numeral 105 represents a resonance cell having rubidium atoms enclosed therein and absorbing a ray of light having a particular wavelength by using atomic energy level transition caused on the rubidium atoms. Reference numeral 106 represents an optical detector for detecting a ray of light passing through the resonance cell 105, 107 a cavity (resonance cavity) for accommodating the resonance cell 105, 108 a varactor diode for gradually multiplying a degree of microwave, 109 a solenoid coil capable of generating a magnetic field for adjusting a resonance frequency of the rubidium atoms enclosed in the resonance cell 105, 110 a rubidium lamp for emitting resonance light, 111 a lamp housing for accommodating the rubidium lamp, 112 a lamp excitation circuit for exciting the rubidium lamp 110 by energizing the rubidium lamp 110 with high frequency microwave, respectively. The aforesaid resonance cell 105, the optical detector 106, the cavity 107, the varactor diode 108, a solenoid coil 109, the rubidium lamp 110, the lamp house 111 and the lamp excitation circuit 112 constitute an OMU (Optical Microwave Unit).

Further, reference numeral 113 represents a heater for keeping the temperature of the OMU constant, and 114 a thermistor capable of varying its resistance depending on the temperature change of the OMU. In FIG. 10, a portion including components of from the first shielding structure 101 to the thermistor 114 schematically shows a cross-section of a double-layer housing structure made of the magnetism shielding structures 101 and 102 accommodating the resonance cell 105 or the like of the components constituting the rubidium atom oscillator.

Furthermore, reference numeral 115 represents a temperature control unit for detecting the resistance of the thermistor 114 and generating a voltage for controlling the temperature of the aforesaid heater 113, 116 a transistor for controlling an electric current to be supplied to the heater depending on the output of the temperature control unit 115, 117 a preamplifier for amplifying the output of the optical detector 106, 118 a low-frequency oscillator for generating a low frequency signal, 119 a synchronism detecting circuit for detecting synchronism in the output of the preamplifier 117 in response to the output of the low frequency oscillator 118, 120 a frequency control circuit for controlling an oscillation frequency of a voltage-controlled crystal oscillator, which will be described later on, depending on the output of the synchronism detecting circuit 119, 121 the voltage-controlled crystal oscillator of which oscillation frequency can be stabilized by using the atomic resonance in the resonance cell 105, and 122 a frequency modulating circuit for modulating in phase the output of the voltage-controlled oscillator 121 in response to the output of the low-frequency oscillator 118 and supplying the same to the aforesaid varactor diode 108, respectively.

Now the principle on which the operation of the rubidium atomic oscillator is based will be described with reference to FIG. 11.

As shown in FIG. 11A, if the rubidium atoms hermetically enclosed within the resonance cell 105 shown in FIG. 10 are placed in a thermal equilibrium state, the rubidium atoms reside in the (5S, F1) level which is a ground state and the (5S, F2) level at an equal probability. Under this state, if a resonance ray of light of the rubidium lamp 110 is irradiated onto the resonance cell 105, then as shown in FIG. 11B, only the rubidium atoms reside in the (5S, F1) level are excited and pumped up to the 5P level. This phenomenon is known as an optical pumping (excitation). However, since the 5P level is an unstable energy level, as shown in FIG. 11C, owing to a spontaneous emission, the atoms residing in this level transit to the (5S, F1) level which is a ground state and the (5S, F2) level at an equal probability.

Thereafter, the resonance ray of light of the rubidium lamp 110 causes the optical pumping leading to excitation that only the rubidium atoms residing in the (5S, F1) level are excited to the 5P level, and the spontaneous emission causes the transition from the 5p level to the (5S, F2) level at equal probability. In this way, this process of excitation and spontaneous emission is repeated. Owing to these repeating processes, as shown in FIG. 1D, a state is brought about in which almost all rubidium atoms populate in exclusively the (5S, F2) level. This state is known as a negative temperature state. Under this state, if a microwave deriving from the output of the frequency modulating circuit 122 undergoing the gradual multiplication process in the varactor diode 108 is effected to the cavity 107 to excite the same, as shown in FIG. 11E, transition is caused on the rubidium atoms residing in the (5S, F2) level to the (5S, F1) due to an induced emission.

At this time, the resonance cell 105 absorbs the optical energy generated from the rubidium lamp 110, with the result that the optical level detectable by the optical detector 106 will be lowered. Then, the probability at which the rubidium atoms residing in the (5S, F2) level transit to the (5S, F1) level will be maximized when the frequency of the microwave is coincident with a frequency corresponding to the energy difference between the (5S, F2) level and the (5S, F1) level (this frequency is known as resonance frequency). Conversely, the probability will be lowered as the difference between the frequency of the microwave and the resonance frequency.

That is, as shown in FIG. 12A, the output of the optical detector 106 increases as the distance of the microwave frequency with respect to the resonance frequency $f_0$ which corresponds to the difference between the (5S, F2) level and the (5S, F1) level. Finally, since the induced emission owing to the microwave is not caused, the optical detector output becomes constant. The concave portion near the resonance frequency $f_0$ of a curve A is known as "dip".

Meanwhile, since the output of the voltage controlled crystal oscillator 121 is subjected to a phase modulated by the low-frequency oscillator 118, frequency variation is caused in a frequency at which the varactor diode 108 excites the cavity. For this reason, the light absorption efficiency of the resonance cell 105 is changed and the optical level detected by the optical detector 106 is also changed. Initially, if the excitation frequency f of the microwave by the varactor diode 108 is equal to the resonance frequency $f_0$ of the resonance cell 105, the excitation frequency f of the microwave deriving from the varactor diode 108 modulated with the low-frequency signal is changed near the bottom portion of the aforesaid dip. Therefore, as shown at reference B in FIG. 12A, the output of the optical detector 106 becomes a signal having a frequency twice the low-frequency modulated frequency.

On the other hand, if the excitation frequency f of the microwave by the varactor diode 108 is higher than the resonance frequency $f_0$ of the resonance cell 105, the excitation frequency f of the microwave deriving from the varactor diode 108 modulated with the low-frequency signal is changed at the rising-up part of the right side. Therefore, as shown at reference C in FIG. 12A, the output of the optical detector 106 changes its phase relative to the low-frequency signal. Conversely, if the excitation frequency f of the microwave by the varactor diode 108 is lower than the resonance frequency $f_0$, the excitation frequency f of the microwave deriving from the varactor diode 108 modulated with the low-frequency signal is changed at the rising-up part of the left side. Therefore, as shown at reference D in FIG. 12A, the output of the optical detector 106 changes its phase opposite to the low-frequency signal.

The output of the optical detector 106 varying as described above is led through the preamplifier 117 to the synchronism detecting circuit 119 in which synchronism is detected with the output of the low-frequency oscillator 118. That is, the output of the optical detector 106 amplified by the preamplifier 117 is supplied to the frequency control circuit 120 in which proportional control, integration control, differentiation control and a combination of these control schemes is effected to the supplied signal to generate a control voltage (see FIG. 12B) which is to be supplied to the voltage-control crystal oscillator 121. With this control voltage, the voltage control crystal oscillator 121 is controlled so that the output thereof becomes equal to the resonance frequency $f_0$ of the resonance cell 105. Thus the output of the rubidium atomic oscillator is supplied to the outside.

As described above, the rubidium atomic oscillator employs the principle of transition between energy levels of atoms. However, the energy level utilized in the oscillator takes a ultra-micro structure in which each of the levels is separated from others by Zeeman effect. Therefore, it is necessary for the rubidium atoms to be kept in a static magnetic field. In a conventional product, this condition is realized by involving the resonance cell 105 within the solenoid coil 109. The static magnetic field which can be created by the solenoid coil 109 employed by the conventional product is about H≈45 (A/m).

Description will be hereinafter made on a construction of a conventional static magnetic field (generating) circuit. FIG. 13 is a diagram schematically showing the construction thereof. As shown in FIG. 13, the static magnetic field generating circuit comprises, for example, a cylindrical cavity resonator 107 having a light beam passing aperture through which a pumping light beam can be incident into the resonator, a toroidal dielectric body 123 to be involved in the cavity resonator 107 so as to attain small-sizing of the cavity resonator 107, an antenna 124 for exciting a microwave within the cavity resonator 107, a gas cell (resonator cell) 105 having rubidium atoms enclosed therein, an optical detector 106 for detecting a light beam passing through the gas cell 105, an adjusting screw 125 for adjusting the resonating frequency of the cavity resonator 107 to the resonance frequency of the rubidium atoms, and a solenoid coil 109 for retaining the rubidium atoms in the static magnetic field. In FIG. 13, the cavity resonator 107 is schematically shown in a cross-sectional manner.

As is disclosed in FIG. 5 of the following patent document 1, the solenoid coil 109 is fabricated by winding a copper wire around a metal wall forming the cavity resonator 107. Although illustrated is one having a winding wire directly wound around the metal wall, the winding portion may be prepared in advance in a manner that a wire is wound around a cylindrical member made of a resin or the like (mechanical part) and this mechanical part having the wire wound therearound may be attached to the cavity resonator 107. Further, one of conventional technologies employs a cavity resonator having not a cylindrical shape but a rectangular piped shape. Also in this case, similarly to the case of the cylindrical shape, the copper wire or the like may be directly wound around the metal wall of the cavity resonator 107 to form the solenoid coil. Alternatively, the wire may be wound around a case made of resin or the like having a thermally insulating function to form the solenoid coil 109 and this solenoid coil may be attached to the cavity resonator 107.

Further, as is disclosed in FIGS. 1 and 6 of the following patent document 2, a wire may be wound around a bottom portion of a yoke having a U-letter cross-section and an electric current may be supplied to the wire so that a magnetic flux may be created from one end of the yoke to the other of the same which are opposing to each other. Thus, a static magnetic field (C field) can be applied to the resonator of a cesium atom oscillator.

[Patent Document 1] Japanese Patent Application Laid-Open No. HEI 6-334520

[Patent Document 2] Japanese Utility Model Application No. SHO 61-100049

Recent request from the market is to attain small-sizing and low-cost production of the rubidium atom oscillator. To this end, many manufacturing companies try to establish technologies enabling the peripheral circuits to be small-sized. However, further small-sizing and low-cost production are requested. In order to respond to the requests, it is indispensable to achieve small-sizing and low-cost production on the OMU. Conventional approaches for this purpose have been made based on a scheme that the mode of the cavity resonator was selectively activated depending on the use mode thereof, the cavity resonator was filled with a material having a high relative dielectric constant and this cavity resonator was provided in the rubidium atom resonator. Similar approaches have been tried and various approaches will be made for attaining the small-sizing of the oscillator from now on. A problem we will encounter at this time is how the static magnetic field generating circuit shall be handled. In the conventional structure described with reference to FIGS. 10 and 13, it is necessary to dispose the resonator cell 105 within the solenoid coil 109. Therefore, layered structure is requested for the static magnetic field generating circuit, with the result that the structure thereof necessarily becomes complicated and freedom of structure arrangement is limited. This fact becomes a problem to be solved when further small-sizing and low-cost production are carried forward.

In particular, when the aforesaid small-sizing and the low-cost production are intended on a thin-shaped products which are recently demanded from the market, a cavity resonator for use in microwave excitation, a semi-coaxial resonator, a dielectric resonator or the like will have a rectangular shape because the aforesaid thin-shaped design is more easily achieved. However, the resonator cell shall be provided within the static magnetic field and hence the solenoid coil shall be formed so as to surround the resonator. Therefore, to increase the thickness of the wire winding portion is unavoidable. Further, the resonator requires a frequency adjusting mechanism. For this reason, the solenoid coil frequently encounters limitation in the winding allowance portion around which the wire is wound. As a consequence, parts constituting the solenoid coil are complicated and high-cost. Some makers employ a scheme of winding a wire directly around the resonance cell to form a coil and a static magnetic field is applied thereto. However, a process for winding a wire to form a solenoid coil is essentially indispensable and hence custom-arrangement is requested depending on mechanical parts combination for handling each case of design. Accordingly, cost increase is unavoidable.

Meanwhile, according to the technology disclosed in the aforesaid patent document 2, the structure has a yoke with a U-letter shape in cross-section provided and a magnetic flux is generated from one end to the other end of the side portions opposing to each other so that the resonance device of the cesium atom oscillator is applied with a static magnetic field. Therefore, the resonance device need not be surrounded with a solenoid coil as described above. Therefore, it becomes possible to enhance a thin-shaped design as compared with a case in which the resonance device is surrounded with a solenoid coil. However, the structure in this case requires certain areas corresponding to the size of the resonance device at the bottom portion and the side portion of the U-letter shaped yoke, respectively. Therefore, the mounting area reduction is also limited. Moreover, a process for winding the wire at the bottom portion of the yoke is indispensable and hence custom-arrangement is requested depending on mechanical parts combination for handling each case of design. Accordingly, cost increase is unavoidable.

SUMMARY OF THE INVENTION

The present invention is made to solve the above problems, and therefore it is an object of the present invention to provide a static magnetic field applying structure for use in an atomic oscillator which enables the atomic oscillator to be small-sized and produced at a low cost.

According to the present invention, in order to attain the above object, there is provided a static magnetic field applying structure for use in an atomic oscillator for applying a static magnetic field to a resonance cell which hermetically encloses therein a predetermined kind of atoms, wherein plural sets of magnetic field generating means are provided with spacing interposed among them, and the resonance cell is disposed in a space between the magnetic field generating means.

In this case, it is preferable that the magnetic field generating means is composed of a solenoid coil which generates a magnetic field in response to a direct current flowing therethrough.

Further, it is preferable that the static magnetic field applying means is composed of a first printed board having a first solenoid coil mounted thereon and a second printed board having a second solenoid coil mounted thereon, each of the printed boards are brought into opposition to each other so that the magnetic fluxes having the same direction can be generated in response to a direct current flowing through the solenoid coils, and the resonance cell is provided in the static magnetic field generated in a space sandwiched between the printed boards.

Further, each of the printed boards may be composed of a multilayer printed board and the solenoid coil may be constructed in such a manner that a ring-like conductor pattern is formed on each layer and a via hole is provided in each layer to establish electrical connection between the ring-like conductor patterns.

Further, the static magnetic field generating means is composed of at least a couple of ring-like conductive patterns having a circular or polygonal shape with a partial cut-away portion, the ring-like conductive patterns being provided on the resonance cell itself so that magnetic fluxes having the same direction can be generated in response to direct currents flowing through the conductive patterns, whereby a static magnetic field is created in a space sandwiched between the ring-like conductive patterns.

Further, according to the present invention, there is provided a static magnetic field applying structure for use in an atomic oscillator for applying a static magnetic field to a resonance cell which hermetically encloses therein a predetermined kind of atoms, wherein a metal rod being shaped to have first and second antenna portions and a solenoid coil wound around the metal rod are provided as magnetic field generating means, and the resonance cell is disposed in a space sandwiched between the antenna portions of the metal rod.

In this case, it is preferable that the magnetic field generating means is composed of a straight conductive pattern formed within an inner layer of a multiple printed board and serving as the metal rod, a coil-like circuit composed of plural number of conductor pattern pieces formed on layers sandwiching the inner layer from both the sides thereof and via holes connecting any couple of the conductor pattern pieces to each other so that the conductor pattern pieces and the via holes collectively constitute and serve as a solenoid coil surrounding the straight conductive pattern, and antenna members serving as the antenna portions provided at both the ends of the straight conductive pattern so that a magnetic flux is released from the antenna members and a static magnetic field can be created in a space between the antenna members, and the resonance cell is provided in the space between the antenna members.

Further, a plurality of straight conductive patterns may be provided in parallel on the inner layer, the antenna members may be provided for each straight conductive pattern at both the ends thereof, and the coil-like circuit may be formed so as to surround the straight conductive patterns collectively.

It is preferable that the atoms are rubidium atoms.

According to the above inventions, plural sets of magnetic field generating means (solenoid coil) are combined for creating a static magnetic filed in a space sandwiched between the solenoid coils. Alternatively, a wire is wound to form a solenoid coil around a metal rod having antenna portions at both the end thereof and the static magnetic field is created in the space sandwiched between the antenna portions. Therefore, the static magnetic field generating means composing the atomic oscillator can be small-sized and produced at a low cost. Moreover, unlike the prior arts, the static magnetic field applying structure of the present invention need not have a layered structure in which the resonance cell is provided in a space surrounded with the solenoid coil. Therefore, the atomic oscillator will have greater freedom in designing the mechanical arrangement thereof, and hence the atomic oscillator can be further small-sized, the structure thereof can be further simplified, with the result that great contribution can be expected in low-cost production of the atomic oscillator.

BRIEF DESCRIPTION OF THE DRAWINGS

FIGS. 7A to 7C are each schematic perspective view showing a printed board having a solenoid coil mounted thereon according to a third modification of the first embodiment;

FIG. 7D is a schematic cross-sectional view showing a static magnetic field applying structure of an atomic oscillator according to the third modification of the first embodiment;

FIGS. 11A to 11E are each diagram for explaining the principle of the conventional rubidium atomic oscillator;

DESCRIPTION OF THE PREFERRED
EMBODIMENTS

[A] Explanation of Principle

Figure 1:
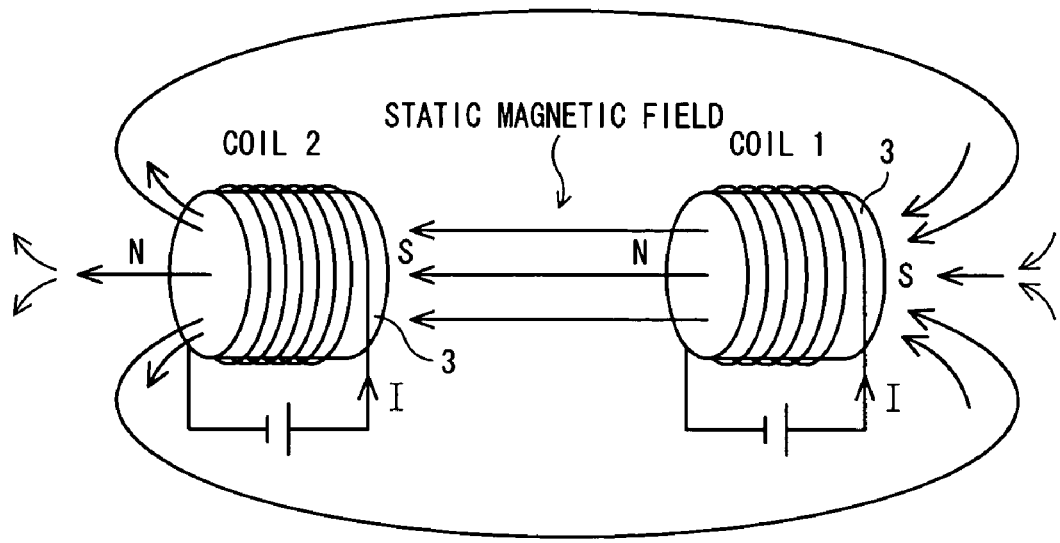
FIGS. 1 and 2 are diagrams for explaining the principles of the present invention.

FIG. 1 is a diagram for explaining the principle of the present invention. A couple of coils (solenoid coils) 1 and 2 are prepared as magnetic field generating means. Each of the coils has a cylindrical member 3 (this member can be obviated) having a wire wound therearound in the same direction, and the couple of solenoid coils are disposed with a certain distance disposed therebetween so that the center axes thereof are coincident with each other. FIG. 1 schematically illustrates a magnetic field generated when an electric current I is flowed in the same direction. As is well known, an electric current flowed through the coil causes a magnetic field and the direction thereof is uniquely determined in accordance with Fleming's rule. As shown in FIG. 1, if the magnetic fluxes generated by the couple of coils 1 and 2 have the same direction, the magnetic fluxes released from the N-pole of the coil 1 converges at the S-pole of the coil 2. For this reason, the space between the coil 1 and the coil 2 becomes a magnetic flux field of an identical direction and this field can serve as a static magnetic field.

Figure 2:
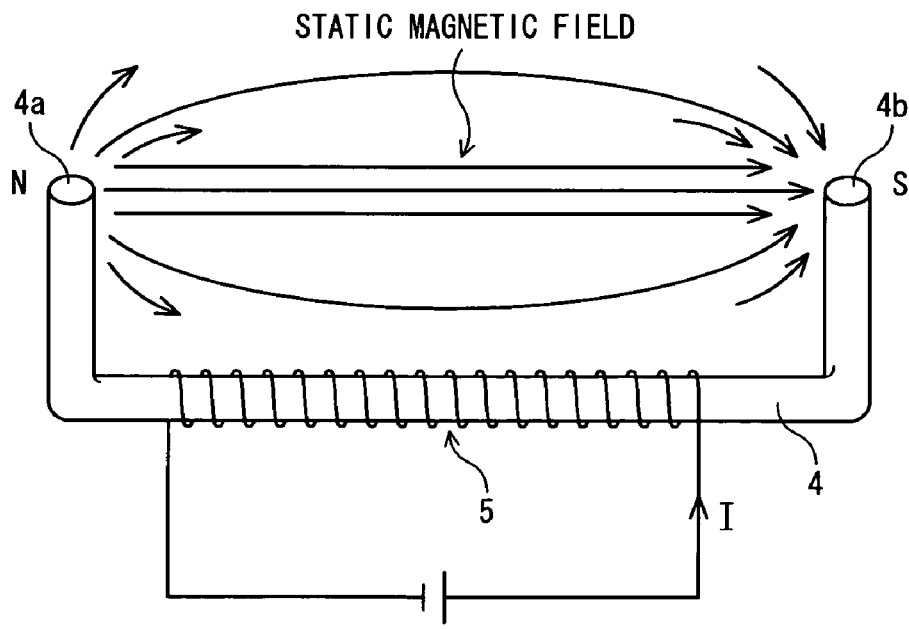

On the other hand, FIG. 2 is also a diagram for explaining the principle of the present invention. As show in the figure, a metal rod 4 is shaped into a U-letter shape each of which ends serving as antenna portions and a wire is wound around the center portion thereof to form a coil (solenoid coil) 5. If an electric current is flowed through the coil 5, the current causes a magnetic flux which has a direction corresponding to the flowing direction of the current and the winding direction of the coil. If the wire is wound around the metal rod 4 to form the coil 5 as shown in the figure, the magnetic flux forms a closed loop including the metal rod 4 and hence the magnetic flux will distribute over the loop including the metal rod 4. If the metal rod 4 is shaped into the U-letter shape, as shown in FIG. 2, the magnetic flux will distribute over a space extending from one end 4a to the other end 4b of the metal rod 4. That is, if the current flowed through the coil 5 is a direct current having a constant magnitude, the region sandwiched between the end 4a to the other end 4b of the U-letter shaped metal rod 4 becomes a static magnetic field. In this way, the metal rod 4 is provided so as to be surrounded with the coil 5 and the magnetic flux caused by the current flowed through the coil 5 is made to have a desired direction, then a static magnetic field generating circuit can be constructed with ease. As will be understood from the above description, the metal rod 4 will be shaped into a U-letter shape with ease as a mechanical part, and the solenoid coil 5 can also be formed around the metal rod 4 with ease. Thus, the static magnetic field can be created by using the mechanical construction with ease.

According to the present invention, if a resonance cell of the atomic oscillator is disposed in the static magnetic field created as described above, desired static magnetic field can be applied to the resonance cell. Therefore, if the resonance cell is disposed within the solenoid coil as in the prior art, it is necessary for the coil to have a diameter which allows the resonance cell to be accommodated therein. However, the mechanical arrangement of the present invention can be free from the limitation in designing the size of the resonance cell or the like.

Now, several embodiments based on the respective principles will be hereinafter described.

[B] Description of First Embodiment

Figure 3B:
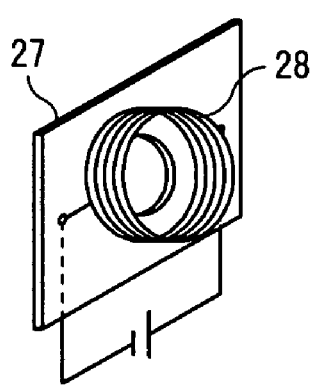
FIGS. 3A and 3B are each perspective view schematically showing a printed board having a solenoid coil mounted thereon according to a first embodiment of the present invention.
Figure 3A:
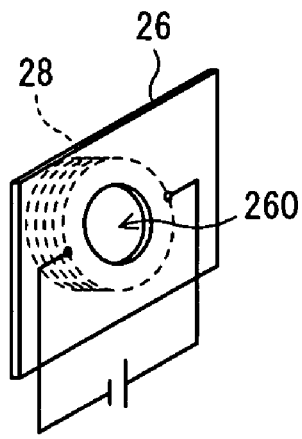
Figure 3C:
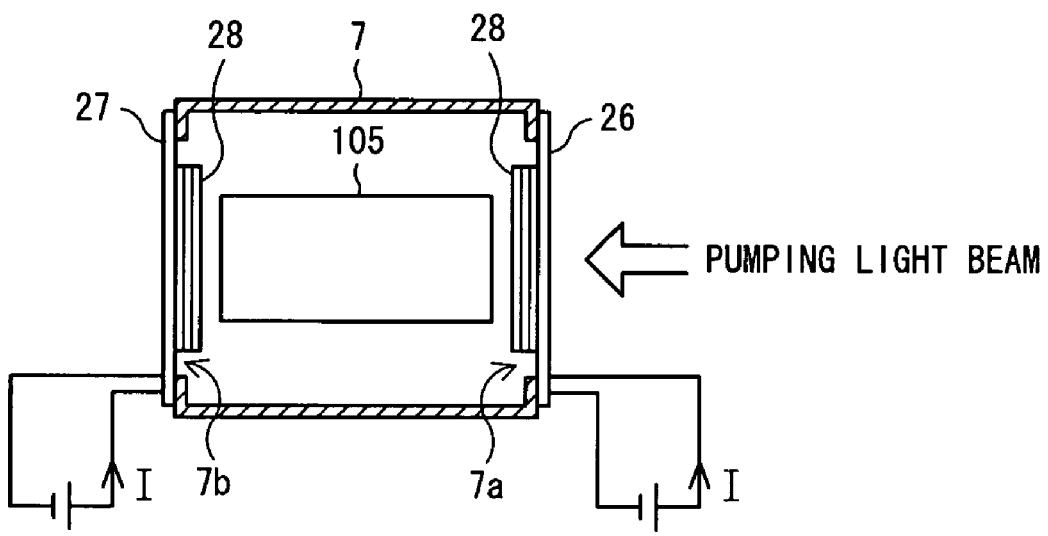
FIG. 3C is a schematic cross-sectional view showing a static magnetic field applying structure of an atomic oscillator according to the first embodiment of the present invention.

FIGS. 3A to 3C are diagrams showing a first embodiment of the present invention. As shown in FIGS. 3A to 3C, reference numerals 26 and 27 represent printed boards, 105 a resonance cell having atoms such as those of rubidium or cesium enclosed therein, 7 a cylindrical cavity resonator having the resonance cell 105 accommodated therein, respectively. The printed board (first printed board) 26 has provided an aperture (light beam passing aperture) 260 capable of leading a pumping light beam into the resonance cell 105 having the above atoms enclosed therein. As shown in FIG. 3B, the printed board (second printed board) 27 has an optical detector such as a PD (not shown) mounted thereon for monitoring the aforesaid pumping light beam. Further, both of the printed boards 26 and 27 have first and second coils (solenoid coils) 28 mounted thereon as magnetic field generating means, respectively, so that the first and second coils do not block the passage of the pumping light beam (light beam passing aperture 260). The solenoid coils are commercially available but they may be formed on the printed board in accordance with a custom requirement. The solenoid coils 28 may be those of IMD (Insertion Mount Device) type or SMD (Surface Mount Device) type.

As shown in FIG. 3C, the printed board 26 having the light beam passing aperture 260 provided is attached to the cavity resonator 7 at an opening 7a which allows the pumping light beam to be led into the cavity resonator 7 so that the first solenoid coil 28 is directed to the inner space of the cavity resonator 7 (hereinafter sometimes simply referred to as resonator 7). Similarly, the printed board 27 having the optical detector provided thereon is attached to the resonator 7 at the other opening 7b so that the second solenoid coil 28 is directed to the inner space of the resonator 7. That is, each of the printed boards 26 and 27 is attached to the resonator 7 so that both of the solenoid coils 28 sandwiches the whole body of the resonator cell 105 within the resonator 7 and that both the end faces (openings 7a and 7b) of the resonator 7 are covered with the printed boards 26 and 27.

The conductor wall space surrounded with the printed boards 26 and 27 and the resonator 7 is defined to have dimensions which can bring the atomic oscillator into the resonance mode at a resonance frequency (in the case of rubidium atomic resonator, the resonance frequency is 6.834 . . . GHz). Meanwhile, the solenoid coils 28 mounted on the printed boards 26 and 27 are set to have a winding of the same direction and a direct current is flowed in the same direction. For this reason, in the present embodiment, the couple of solenoid coils 28 have the same direction of the winding. However, the direction of the coil winding and the direction in which the current is flowed can be arbitrarily selected under condition that the generated magnetic fluxes have the same direction.

Figure 10:
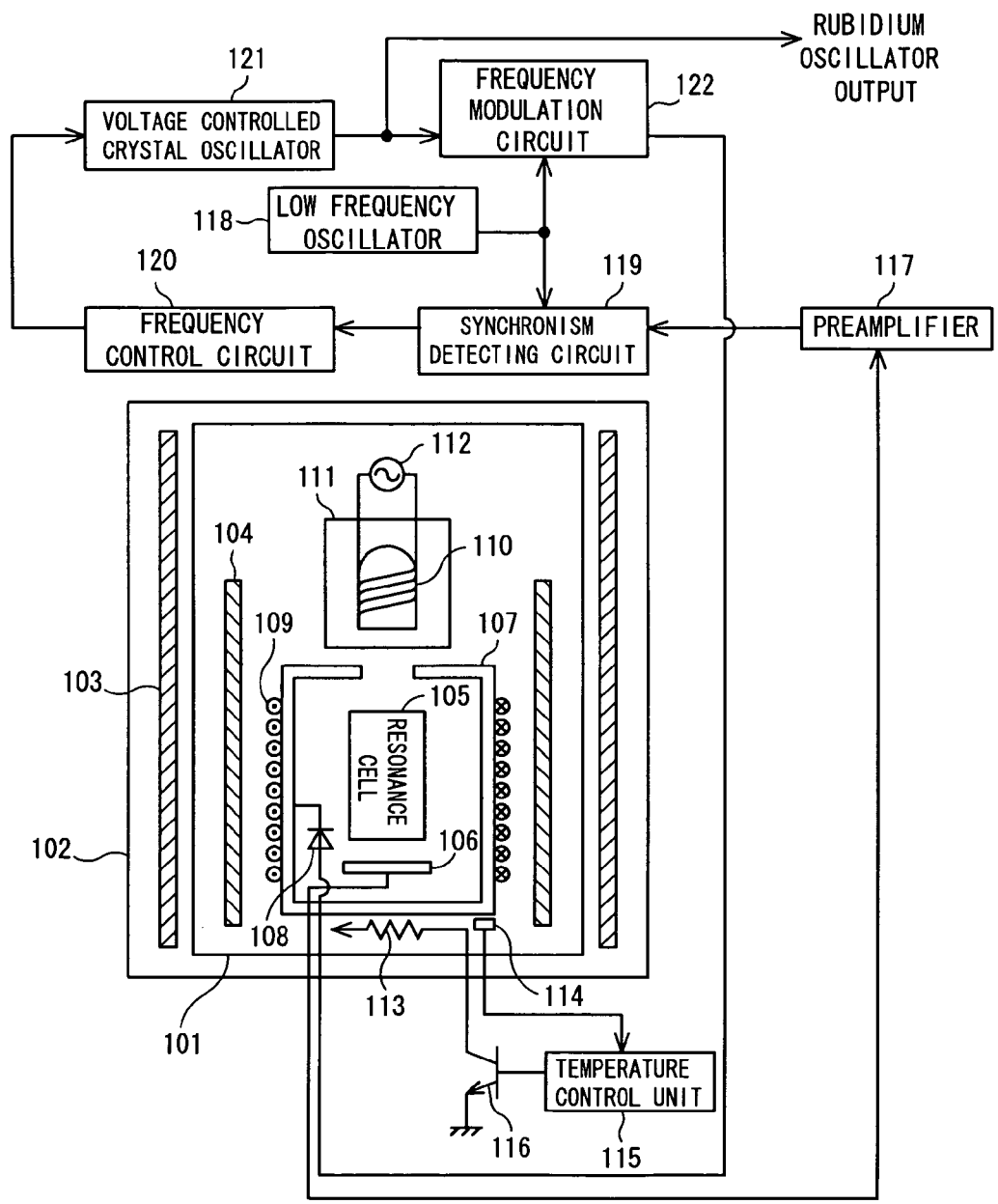
FIG. 10 is a diagram for explaining function and construction of a conventional rubidium atomic oscillator.
Figure 12A:
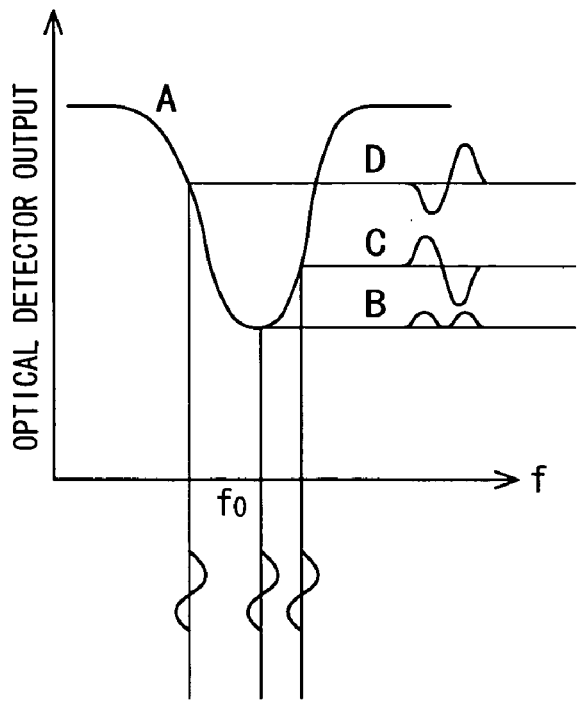
FIG. 12A is a diagram illustrating relation between the excited frequency and an output of an optical detector to which reference is made for explaining the operation of the rubidium atomic oscillator shown in FIG. 10.
Figure 12B:
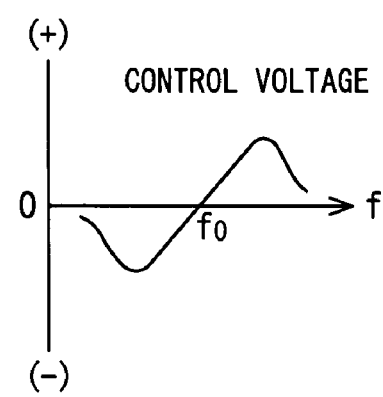
FIG. 12B is a diagram illustrating a control voltage to be applied to a voltage controlled oscillator to which reference is made for explaining the operation of the rubidium atomic oscillator shown in FIG. 10.
Figure 13:
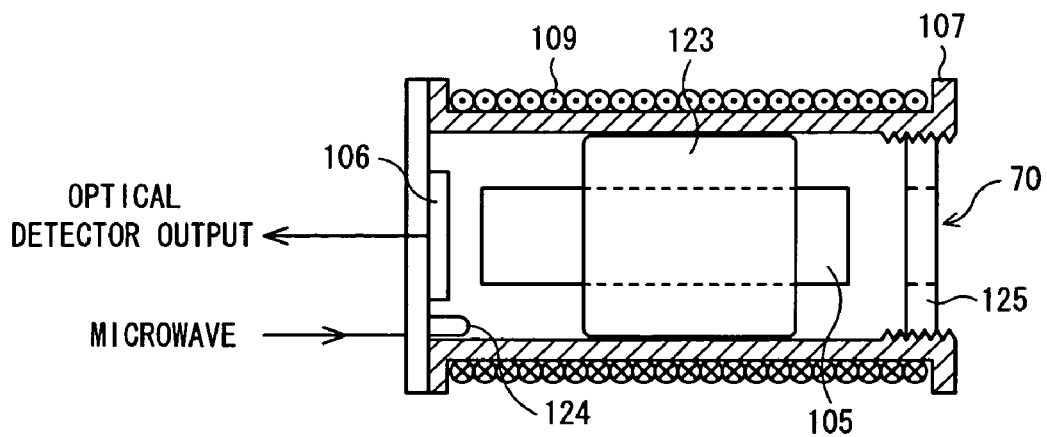
FIG. 13 is a schematic cross-sectional view showing a construction of a conventional static magnetic field applying (generating) circuit.

In this way, if an electric current is flowed through the respective solenoid coils 28, a static magnetic field can be created in a space sandwiched between the solenoid coils opposing to each other, with the result that the resonance cell 105 can be applied with the static magnetic field. That is, in the present embodiment, the couple of solenoid coils are provided so that a space is interposed between the coupe of solenoid coils and the resonance cell 105 is provided in the space sandwiched between the solenoid coils 28. Other portions of the atomic resonator are fundamentally the same as those of the aforesaid arrangement described with reference to FIG. 10.

As described above, the required intensity of the static magnetic field is about 45 (A/m) in a conventional unit. If the length of the solenoid coil 28 does not have an enough length as compared with the diameter thereof, the intensity H of the magnetic field H can be given by the following equation (1) where a represents a diameter, L the length, n a number of turns per unit length, I the magnitude of current.

$$H = nIL/(L^2 + 4a^2)^{1/2} \qquad (1)$$

As will be understood from the above equation, if the magnitude of the current, the number of turns and the length are not variable, the intensity of the generated magnetic field will be increased as the radius becomes small. In the present embodiment, the coil is intended to have a small radius as compared with a conventional one. Therefore, there are certain allowance in reducing the number of turns and the magnitude of current for obtaining the magnetic field having an intensity equivalent to that of the conventional arrangement. The following Table 1 lists results of numerical calculations of a conventional arrangement and the present embodiment by which it becomes possible to confirm the present embodiment can be realized. Calculation is made for the present embodiment under the condition that the coil length is 3 mm, the coil radius 3 mm, the diameter of the wire 0.25 mm, and the magnitude of electric current 15 mA.

TABLE 1

|  | prior art | present embodiment |
| --- | --- | --- |
| coil length: L (mm) | 17.5 | 3 |
| coil radius: a (mm) | 8.4 | 3 |
| current: I (A) | 0.015 | 0.015 |

TABLE 1-continued

| | prior art | present embodiment |
|---|---|---|
| number of turns per unit length: n (T/m) | 4000 | 4000 |
| intensity of magnetic field: H (A/m) | 43.3 | 26.8 |

As is shown in Table 1, only one coil is sufficient for creating a magnetic field having a desired level of intensity of 26[A/m]. In the present embodiment, since a couple of coils 28 opposing to each other are utilized for generating the magnetic field, a magnetic field of further strong intensity can be created. Accordingly, it was confirmed that the present embodiment could be realized from this standpoint.

As described above, according to the present embodiment, owing to the combination of the couple of solenoid coils 28 separated from each other, the static magnetic field generating circuit constituting the OMU of the atomic oscillator can be constructed in a manner of small-sizing and low-cost production. Moreover, unlike the prior arts, the static magnetic field applying structure of the present invention need not have a layered structure in which the resonance cell is provided in a space surrounded with the solenoid coil. Therefore, the atomic oscillator will have greater freedom in designing the mechanical arrangement thereof, and hence the atomic oscillator can be further small-sized, the structure thereof can be further simplified, with the result that great contribution can be expected in low-cost production.

[B1] Description of First Modification

Figure 4:
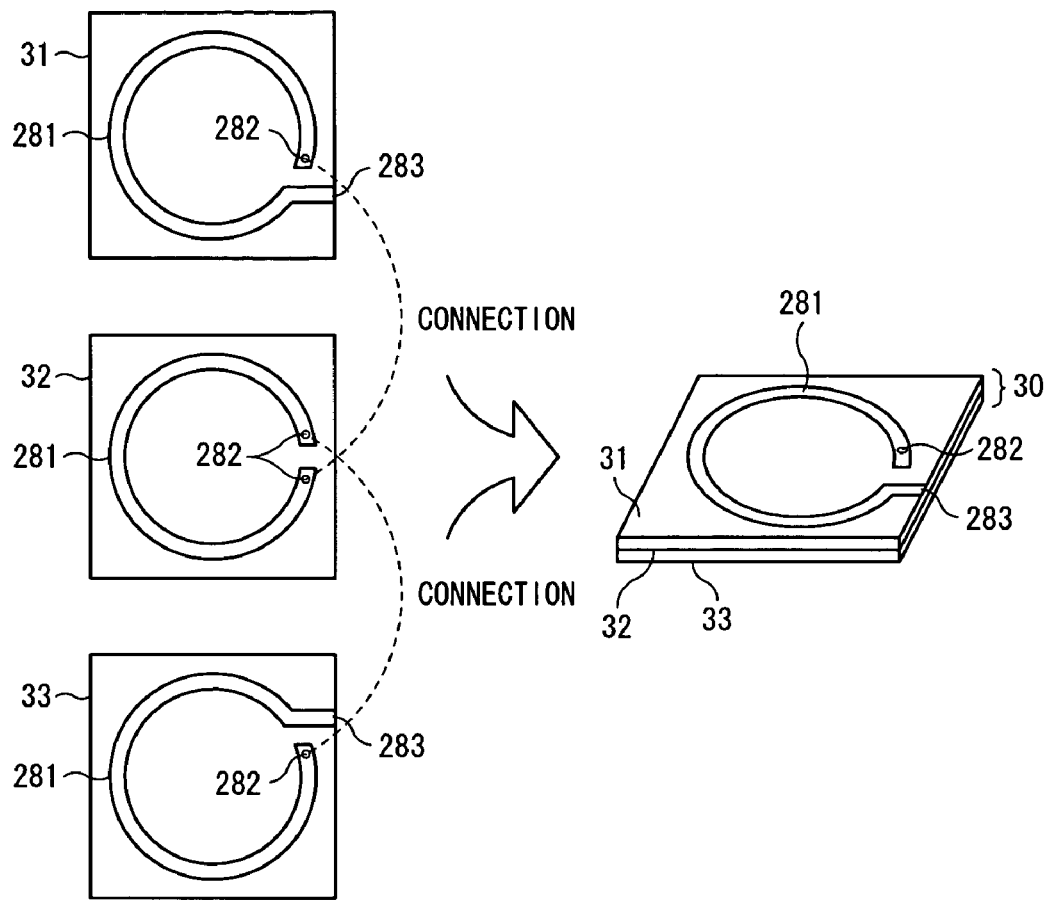
FIG. 4 is a diagram showing a first modification of the first embodiment to which reference is made for explaining a case in which the solenoid coil is composed of a multilayer printed board.

Subsequently, description will be made on an example in which, as for example shown in FIG. 4, the above-described solenoid coil 28 is constructed by using a multilayer printed board 30. In FIG. 4, reference numerals 31, 32 and 33 represent interlayer patterns of a multilayer printed board (in this case three-layer printed board) 30. As shown in FIG. 4, each layer constituting the multilayer printed board 30 has provided thereon a ring-like conductive pattern 281 with a partial cut-away portion made of a micro strip line (or strip line). The ring-like conductive pattern 281 on each layer is electrically connected with each other through a via hole (or alternatively, through hole or inner via hole) 282, as shown with dotted lines in FIG. 4. The electrical connection is made so that the ring-like conductive patterns 281 on the respective layers and the via holes collectively constitute a solenoid coil. Further, each of the uppermost layer and the lowermost layer of the multilayer printed board 30 has provided a foot pattern 283 on the surface thereof so that an electric current can be applied thereto. The conductive pattern formed on each layer need not always have the aforesaid ring-like shape but a polygonal shape so long as an aperture allowing the pumping light beam to be led into the resonance cell 105 can be provided at the center of the multilayer printed board 30.

With the above arrangement, for example, if the foot pattern 283 on the interlayer pattern 31 is applied with a plus potential and the foot pattern 283 on the interlayer pattern 33 is applied with a minus potential, a current will be flowed corresponding to the potential difference therebetween. In this case, the current flowing path is formed into a coil-like circuit having an identical center axis, i.e., the coil-like circuit can serve as a solenoid coil.

Figure 5:
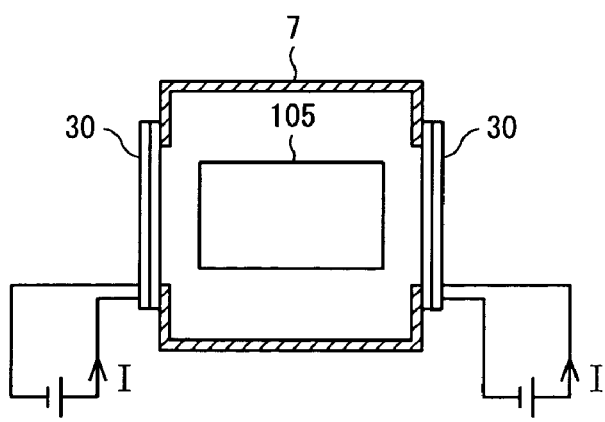
FIG. 5 is a schematic cross-sectional view showing a static magnetic field applying structure of an atomic oscillator according to the first modification of the first embodiment.

At least a couple of the multilayer printed boards 30 having the above structure are prepared and attached to the opposing opening portions of the resonator 7 as for example shown in FIG. 5. That is, the couple of multilayer printed boards 30 substitute for the aforesaid printed boards 26 and 27 described with reference to FIGS. 3 and 4. Then, voltages are applied to the foot patterns 283 so that magnetic fluxes having the same direction are caused in the respective multilayer printed boards 30. Thus, a static magnetic field can be generated in a space sandwiched between the opposing multilayer printed boards 30, that is the static magnetic field can be applied to the resonance cell 105.

While in the present embodiment description has been made on an example having the three-layer printed board, the embodiment may employ a multilayer printed board having four or more layers. Also, the embodiment may employ a single-layer printed board. The requested intensity of the magnetic field will differ depending on the shape or size of the resonance cell. However, the intensity of the magnetic field created by the coil can be adjusted by adjusting the magnitude of the current flowed through the coil. Therefore, even if the magnetic field do not have a sufficient degree of intensity due to the insufficient number of turns, this insufficiency in the magnetic field intensity can be supplemented by increasing the magnitude of current to be flowed in the coil.

As described above, according to the present modification, the patterning can be effected to provide the ring-like conductive patterns 282 on the interlayer surface of the multilayer printed board 30 so as to form a solenoid coil. Therefore, unlike the prior art, the winding process for forming the coil can be obviated. Moreover, since the resonance cell 105 can be small-sized, the cavity resonator 7 can also be small-sized, with the result that the atomic oscillator can be remarkably small-sized and produced at low cost.

[B2] Description of Second Modification

Figure 6A:
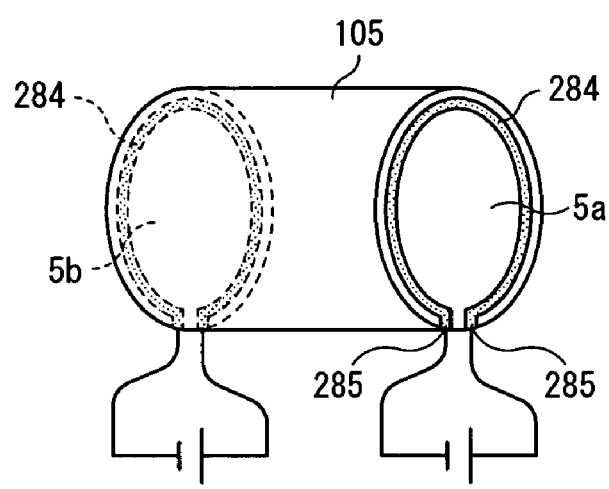
FIG. 6A is a schematic perspective view of a resonance cell according to a second modification of the first embodiment.
Figure 6B:
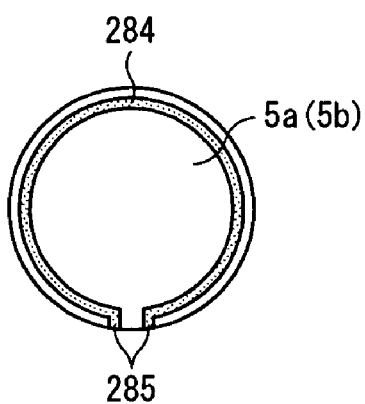
FIG. 6B is a diagram schematically showing one plan view of the resonance cell shown in FIG. 6A.

Subsequently, description will be made on a second modification of the aforesaid static magnetic field applying structure with reference to FIGS. 6A and 6B. FIGS. 6A and 6B show an example in which a columnar shaped resonance cell 105 has at the opposing flat portions 5a and 5b a ring-like conductive patterns 284 with a partial cut-away portion which is formed by metalization (chemical vapor deposition). FIG. 6A is a schematic perspective view of the resonance cell 105 and FIG. 6B is a diagram schematically showing the flat portion 5a (5b) of the resonance cell 105. Also in the present example, the conductive pattern may be a polygonal shape so long as an aperture allowing the pumping light beam to pass through can be provided.

If pattern ends 285 which are formed as cut ends are applied with a direct current potential, an electric current corresponding to the potential difference will be flowed and a magnetic flux having a direction along the center axis of the ring-like conductive patterns 284 is caused. If the magnetic fluxes created by the ring-like conductive patterns 284 provided on both the flat portions 5a and 5b of the resonance cell 105 have the same direction, the region sandwiched between the ring-like conductive patterns 284 will become a static magnetic field. In other words, the present example is equivalent to a case in which a solenoid coil having a single turn of winding is provided on each of the flat portions 5a and 5b. While in the present example the solenoid coil is one formed by metalization with a certain kind of metal, the metal conductor may be formed by attaching a copper wire or the like with an adhesive or the like. Also in this case the same effect or action can be expected. While in the present example a relatively large magnitude of electric current is requested for obtaining a magnetic field having an intensity equivalent to that of a prior art. However, if the small-sizing of the resonance cell 105 is enhanced, it becomes possible to achieve the function as the static magnetic field applying structure with a magnetic field having a minute intensity. In this case, it can be expected that the present arrangement can work effectively as the static magnetic field applying structure.

As described above, the resonator cell 105 of the present embodiment has a conductive patterns 284 directly formed on the flat portions of the resonance cell 105 so that the resonance cell 105 and the static magnetic filed generating circuit are unitarily constructed. Therefore, a static magnetic filed having a necessary intensity can be created and the atomic oscillator can be further small-sized and produced at low cost.

[B3] Description of Third Modification

While the aforesaid example describe with reference to FIG. 3 has a couple of solenoid coils 28, three or more solenoid coils 28 may be provided. For example, if the arrangement of the static magnetic field applying structure is made to have three solenoid coils 28, as shown in FIGS. 7A and 7C, in addition to the printed boards 26 and 27 having the similar solenoid coil 28 provided thereon, a printed board 26' having the solenoid coil provided thereon as shown in FIG. 7B is further prepared. As shown in FIG. 7B, the printed board 26' has an aperture (through hole) 261 having a diameter large enough for the resonance cell 105 to pass therethrough. Then, the solenoid coil 28 is attached to the printed board 26' so as not to block the aperture 261.

Similarly to the case shown in FIG. 3C, the printed board 26 having the light beam passing aperture 260 provided is attached to the resonator 7 at an opening 7a which allows the pumping light beam to be led into the resonator 7 so that the solenoid coil 28 is directed to the inner space of the resonator 7, the printed board 27 having the optical detector provided thereon is attached to the resonator 7 at the other opening 7b thereof so that the second solenoid coil 28 is directed to the inner space of the resonator 7, and the printed board 26' is attached to the resonator cell 105 at, for example, the middle portion thereof so that the resonator 7 is allowed to pass through the through hole 261, as shown in FIG. 7D. As will be understood from the above description, the space for accommodating the resonator cell 105 is partitioned into two partial spaces by the printed board 26' and the resonance cell 105 is partly accommodated in a space sandwiched by the opposing solenoid coils 28 provided in the resonator 7. Also in this case, the direction of the coil winding and the direction in which the current is flowed may be selected under the condition that the generated magnetic fluxes have the same direction.

In this way, if electric currents are flowed through three solenoid coils 28, magnetic fluxes having the same direction are generated in the spaces sandwiched between the opposing solenoid coils 28 and a static magnetic field is created. Accordingly, if the present example is supplied with an electric current having the same magnitude as that of the example described with reference to FIGS. 3A to 3C, a stronger static magnetic field can be applied to the resonance cell 105.

Any one of or all of the above-described printed boards 26', 27 and 28 may be constructed by using the arrangement of the multilayer printed board 30 described with reference to FIG. 4. Further, any of the above-described static magnetic field generating circuits described together with the first embodiment and its modifications may be properly combined with other one or more static magnetic field generating circuits, and the combined static magnetic field generating circuits may be introduced into the static magnetic field applying structure. For example, in the structure shown in FIG. 3A, one of the board pair sandwiching the resonance cell 105 may have an arrangement of the board 26 or 27 shown in FIG. 3A or 3B and the other of the board pair sandwiching the resonance cell 105 may have an arrangement of the multiplayer printed board 30 shown in FIG. 4. Alternatively, one of the board pair sandwiching the resonance cell 105 may have a vapor deposited structure such as one shown in FIG. 6A.

[C] Description of Second Embodiment

Figure 8A:
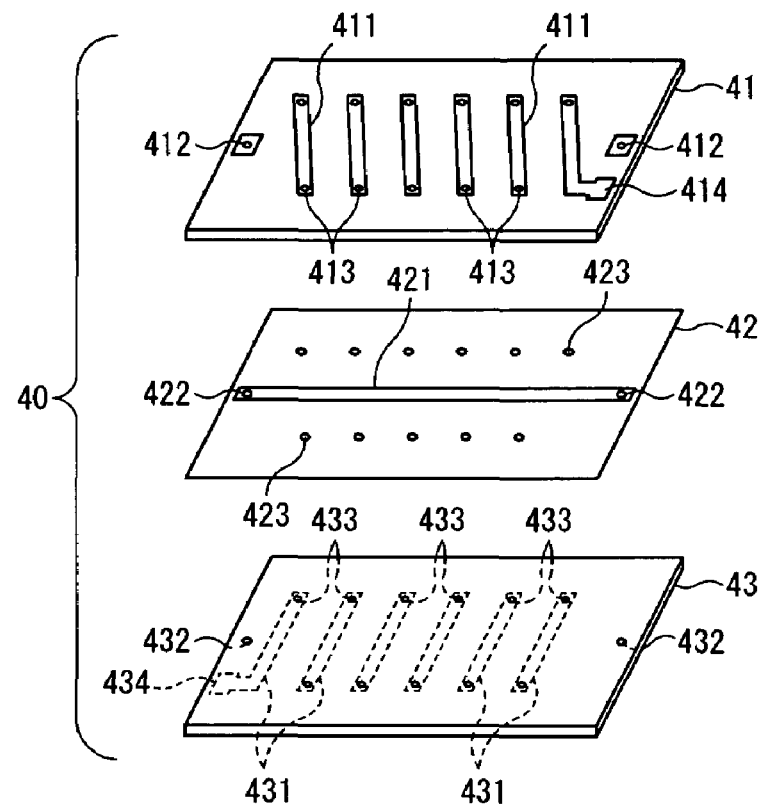
FIG. 8A is a schematic perspective view showing an inter layer pattern of the multilayer (three-layer) printed board according to a second embodiment of the present invention.
Figure 8B:
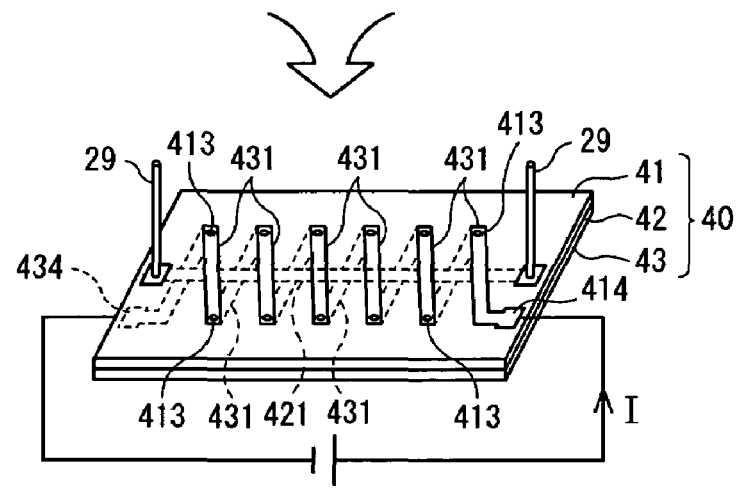
FIG. 8B is a schematic perspective view showing a construction using the multilayer printed board shown in FIG. 8A to which reference is made for explaining how a static magnetic field generating circuit can be realized with this construction.
Figure 8C:
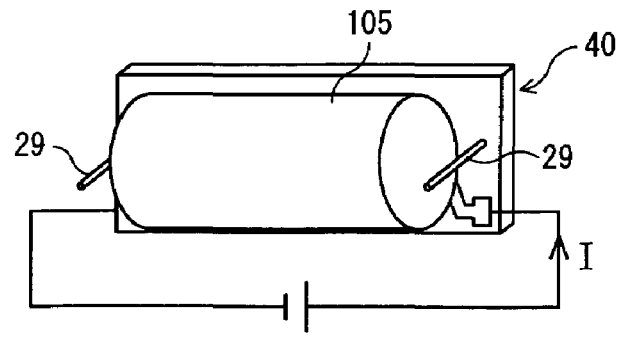
FIG. 8C is a schematic perspective view showing a construction provided with a resonance cell in a static magnetic field created by the static magnetic field generating circuit shown in FIG. 8B.

FIG. 8 is a set of diagrams each showing a second embodiment of the present invention. Of these diagrams, FIG. 8A is a schematic perspective view showing interlayer patterns 41, 42 and 43 of a multilayer (three layers) printed board 40. FIG. 8B is a schematic perspective view showing a construction realizing a static magnetic field generating circuit which is equivalent to one using the multilayer printed board 40 described with reference to FIG. 2. FIG. 8C is a schematic perspective view showing a construction provided with a resonance cell 105 in a static magnetic field created by the static magnetic field generating circuit shown in FIG. 8B.

As shown in FIG. 8A, an interlayer pattern 42 serving as an intermediate layer of the multilayer printed board 40 is composed of a straight conductive pattern (hereinafter referred to as straight pattern) 421 formed of a microstrip line (or strip line) and via holes 422 provided on both the sides of the straight pattern 421. Each of interlayer patterns 41 and 43 sandwiching the intermediate interlayer pattern 42 from both the sides thereof is composed of plural number of conductor pattern pieces 411 and 431 formed of microstrip lines (or strip lines). The plural number of conductor pattern pieces 411 are arrayed in parallel with predetermined intervals interposed among them, and the plural number of conductor pattern pieces 431 are also arrayed in parallel with predetermined intervals interposed among them, and the array of conductor pattern pieces 411 and the array of conductor pattern pieces 431 are positioned so that they collectively form staggered relationship crossing relative to each other. The straight pattern 421 is interposed between the array of conductor pattern pieces 411 and the array of conductor pattern pieces 431 so that the straight pattern 421 forms solid crossing with the array of conductor pattern pieces 411 and the array of conductor pattern pieces 431.

Each of the conductor pattern pieces 411 and 431 has at both the end thereof via holes (or inner via holes) 413 and 433. In correspondence between the respective positions of the via holes 413 and 433, any one of the via holes 413 of the interlayer pattern 41 is electrically connected to corresponding one of the via holes 433 of the interlayer pattern 43 through corresponding one of the via holes (or inner via holes) 423 which is provided in the interlayer pattern 42 of the intermediate layer also in the respective positions of the via holes 413 and 433 (see FIG. 8B), with the result that any one of the conductor pattern pieces 411 of the interlayer pattern 41 is electrically connected to corresponding one of the conductor pattern pieces 431 of the interlayer pattern 43. In this way, a coil-like circuit, i.e., a solenoid coil is constructed so that it surrounds the straight pattern 421 of the interlayer pattern 42 of the intermediate layer. That is, this coil-like circuit serves as a coil 5 shown in FIG. 2 and the straight pattern 421 serves as the portion of the metal rod 4.

Accordingly, if a direct current is flowed from the foot patterns 414 and 434 (see FIGS. 8A and 8B) which are provided for applying an electric current to the coil-like circuit, then a magnetic flux is caused. This magnetic flux will converge and pass through the straight pattern 421 of the interlayer pattern 42 of the intermediate layer, and be released from the pattern end (metal end) to the space. As has been described above with reference to FIG. 2, one of the metal ends becomes an N-pole and the other end becomes S-pole. Thus, if the metal rod 4 is shaped into a U-letter shape, then a static magnetic field can be generated in the region sandwiched between the end portions (antenna portions). That is, the magnetic field created by the solenoid coil 5 can be arbitrary set by using the metal member.

On the basis of the above idea, the present embodiment is arranged as follows. That is, the straight pattern 421 is made to have a pair of metal pins (antenna members) 29 standing on both the ends thereof through via holes 412, 422 and 432 provided in the interlayer patterns 41, 42 and 43, respectively (see FIG. 8A) so that the pair of metal pins are electrically connected to the straight pattern 421 (see FIG. 8B). In this way, a C-letter shaped metal rod arrangement is constructed together with the straight pattern 421 of the interlayer pattern 42 of the intermediate layer, and a static magnetic field can be created in the space sandwiched between the couple of metal pins 29. Therefore, as shown in FIG. 8C, if the resonance cell 105 is disposed in the space between the couple of metal pins 29, the resonance cell 105 can be applied with a necessary static magnetic filed.

While in the present embodiment the metal pins 29 are utilized for constructing the U-letter shaped metal rod 4, the antenna portion may be unitarily formed by using a flexible printed board or the like. With this arrangement, a structure for generating an equivalent static magnetic field can be made by only a patterning process. Further, while the above arrangement of the metal rod 4 is shaped into a U-letter shape, an arbitrary shape other than the U-letter shape can be employed so long as the arrangement has at least two end portions serving as antennas for generating the static magnetic field.

Meanwhile, a metal having a low magnetic permeability tends to be magnetized if it is placed in a magnetic field for a long period of time. If the metal rod 4 is magnetized, the magnetic filed caused by the solenoid coil 5 will be overlapped with a magnetic field caused by the metal rod 4, and the intensity of the static magnetic field is undesirably intensified, which fact can lead to an uneven magnetic field intensity. Therefore, it is desirable for the aforesaid conductor patterns 411, 421 and 431 to be made of a material having a high magnetic permeability (e.g., permalloy, copper, copper foil applied with a metal plating).

As described above, according to the present embodiment, the static magnetic field generating circuit is constructed by the multilayer printed board 40 having a conductor pattern composed of the straight pattern and the plural number of conductor pieces which are collectively necessary for constructing the arrangement of the metal rod 4 and the solenoid coil 5. Therefore, the winding process for forming the solenoid coil 5 can be obviated, with the result that the static magnetic field generating circuit can be remarkably small-sized (including thin-shaped) and produced at low cost.

[C1] Description of Modification

Figure 9A:
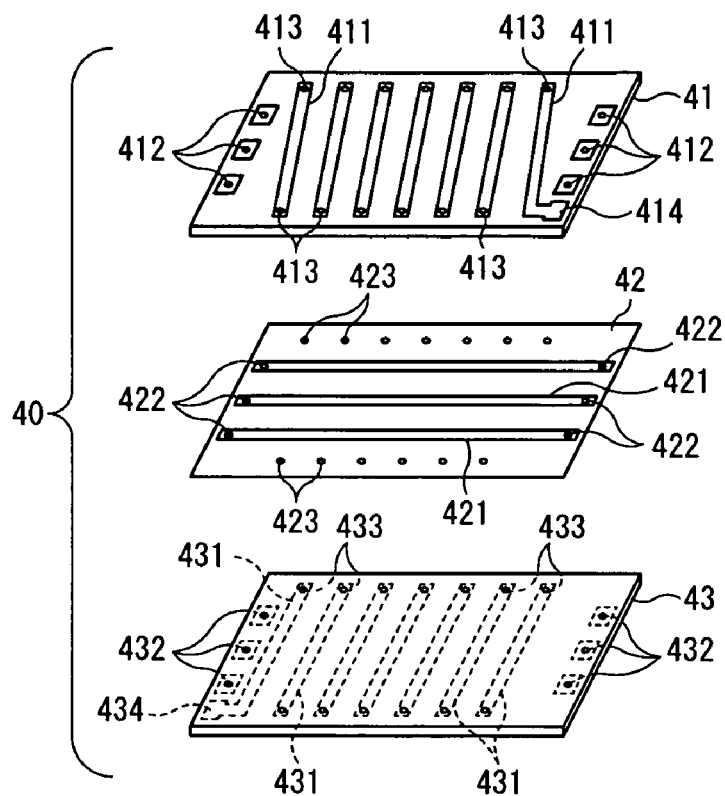
FIG. 9A is a schematic perspective view showing an inter layer pattern of the multilayer (three-layer) printed board according to a modification of the second embodiment.

While in the above-described second embodiment only one straight pattern 422 is formed on the intermediate layer (interlayer pattern 42), as for example shown in FIG. 9A, a plural number of straight patterns 421 (in this case, three straight patterns) may be provided in parallel as the interlayer pattern 42 of the intermediate layer. The interlayer patterns 41 and 43 are also provided to sandwich the inter layer pattern 42. Each of the interlayer patterns 41 and 43 is also composed of plural number of conductor pattern pieces 411 and 431. The plural number of conductor pattern pieces 411 are arrayed in parallel with predetermined intervals interposed among them, and the plural number of conductor pattern pieces 431 are also arrayed in parallel with predetermined intervals interposed among them. The array of conductor pattern pieces 411 and the array of conductor pattern pieces 431 are positioned so that they collectively form staggered relationship relative to each other while the three straight patterns 421 are interposed between the arrays of conductor pattern pieces 411 and 431 (the straight pattern 421 also forms solid crossing with the array of conductor pattern pieces 411 and 431). Since there are three straight patterns 421 formed on the intermediate layer, there are also three sets of via holes 412, 422 and 432 of the respective interlayer patterns 41, 42 and 43, correspondingly. Further, components the same as or similar to those having described above are identified by the same reference numerals unless otherwise specified.

Also in this case, each of the conductor pattern pieces 411 and 431 has at both the end thereof via holes 413 and 433 in correspondence to each other, and any one of the via holes 413 of the interlayer pattern 41 is electrically connected to the corresponding one of the via holes 433 of the interlayer pattern 43 through corresponding one of the via holes 423 which are provided in the interlayer pattern 42 of the intermediate layer (see FIG. 9B), with the result that any one of the conductor pattern pieces 411 of the interlayer pattern 41 is electrically connected to the corresponding one of the conductor pattern pieces 431 of the interlayer pattern 43. In this way, a coil-like circuit surrounding the three straight patterns 421 of the interlayer pattern 42, i.e., a solenoid coil is constructed. That is, this coil-like circuit serves as a coil which corresponds to coil 5 shown in FIG. 2 and this coil can involve the three straight patterns 421 serving as the metal rod 4.

Figure 9B:
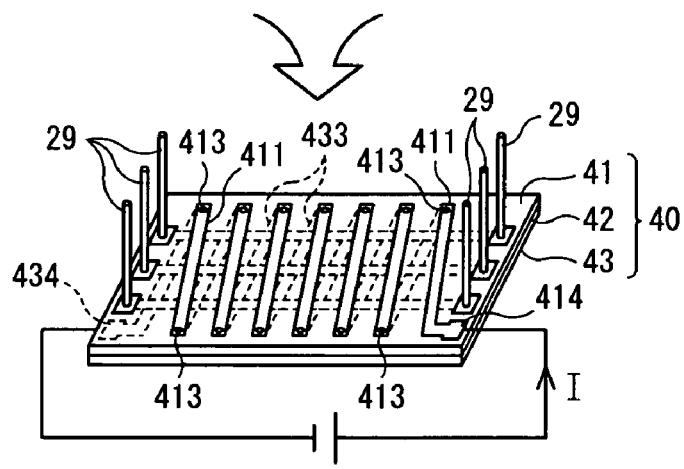
FIG. 9B is a schematic perspective view showing a construction using the multilayer printed board shown in FIG. 9A to which reference is made for explaining how a static magnetic field generating circuit can be realized with this construction.

Furthermore, each of the straight patterns 421 is made to have a pair of metal pins 29 (six pins in total) standing on the both ends thereof through the via holes 412, 422 and 432 provided in the interlayer patterns 41, 42 and 43, respectively (see FIG. 9A) so that the pair of metal pins are electrically connected to the straight patterns 421, respectively (see FIG. 9B). In this way, three sets of U-letter shaped metal rod arrangements are constructed together with the straight patterns 421 of the interlayer pattern 42 of the intermediate layer, and a static magnetic field can be created in the space sandwiched between the respective couples of the metal pins 29.

Figure 9C:
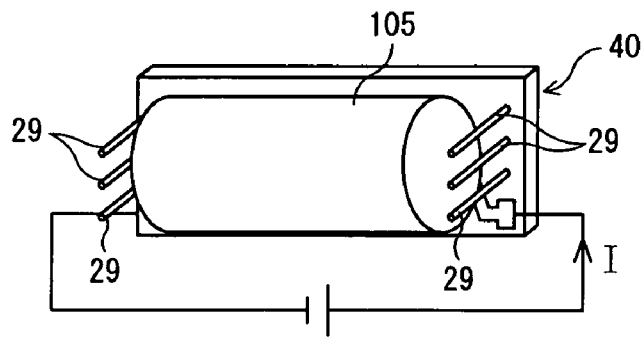
FIG. 9C is a schematic perspective view showing a construction provided with a resonance cell in a static magnetic field created by the static magnetic field generating circuit shown in FIG. 9B.

Accordingly, as for example shown in FIG. 9C, if the resonance cell 105 is disposed in the space between the metal pins 29, as compared with the arrangement shown in FIGS. 8A to 8C, a static magnetic field having a greater intensity can be applied to the resonance cell 105. In particular, in the present embodiment, the coil-like circuit composed of the conductor pattern pieces 411 and 413 collectively is arranged to surround the three straight patterns 421 collectively. Therefore, as compared with a case in which a set of the conductor pattern pieces 411 and 413 constituting the coil-like circuit is prepared for each of the straight patterns 421, the area necessary for the multilayer printed board 40 can be more effectively minimized and a static magnetic field having a greater intensity can be created.

As has been described above, according to the above respective embodiments, two or more solenoid coils are combined for creating the static magnetic filed in the space sandwiched between the solenoid coils. Alternatively, a wire is wound to form a solenoid coil around a metal rod having antenna portions at both the end thereof and the static magnetic field is created in the space sandwiched between the antenna portions. Therefore, the static magnetic field generating means composing the OMU of the atomic oscillator can be small-sized and produced at a low cost. Moreover, unlike the prior arts, the static magnetic field applying structure of the present embodiment need not have a layered structure in which the resonance cell is provided in a space surrounded with the solenoid coil. Therefore, the atomic oscillator will have greater freedom in designing the mechanical arrangement thereof, and hence the atomic oscillator can be further small-sized, the structure thereof can be further simplified, with the result that great contribution can be expected in low-cost production of the atomic oscillator.

Therefore, great contribution can be expected in small-sizing and low-cost production of the atomic oscillator which is utilized as a clock source necessary for various kinds of information communication. Accordingly, the utility of the present invention is considered to be extremely high.

It is needless to say that the present invention is not limited to the above-described embodiments and modifications but various changes and modifications may be effected without departing from the spirit or scope of the present invention.

What is claimed is:

1. An atomic oscillator comprising:
a static magnetic field applying structure for applying a static magnetic field to a resonance cell which hermetically encloses therein a predetermined kind of atoms, wherein said structure comprises:
a first magnetic field generating unit and a second magnetic field generating unit which are capable of generating variable magnetic fields and are electrically independently provided with spacing interposed among them, and opposed to each other so that the magnetic fluxes having the same direction can be generated in said first magnetic field generating unit and said second magnetic field generating unit, and
said resonance cell is disposed in a space between said first magnetic field generating unit and said second magnetic field generating unit.

2. A static magnetic field applying structure for use in an atomic oscillator according to claim 1, wherein
each of said first magnetic field generating unit and said second magnetic field generating unit is composed of a solenoid coil which generates a magnetic field in response to a direct current flowing therethrough.

3. A static magnetic field applying structure for use in an atomic oscillator for applying a static magnetic field to a resonance cell which hermetically encloses therein a predetermined kind of atoms, wherein
plural sets of magnetic field generating means are provided with spacing interposed among them, and
said resonance cell is disposed in a space between said magnetic field generating means,
said magnetic field generating means is composed of a solenoid coil which generates a magnetic field in response to a direct current flowing therethrough,
said static magnetic field generating means is composed of a first printed board having a first solenoid coil mounted thereon and a second printed board having a second solenoid coil mounted thereon, and each of the printed boards oppose to each other so that the magnetic fluxes having the same direction can be generated in response to a direct current flowing through said solenoid coils, and
said resonance cell is provided in the static magnetic field generated in a space sandwiched between said printed boards.

4. A static magnetic field applying structure for use in an atomic oscillator according to claim 3, wherein each of the printed boards is composed of a multilayer printed board and said solenoid coil is constructed in such a manner that a ring-like conductor pattern is formed on each layer and a via hole is provided in each layer to establish electrical connection between said ring-like conductor patterns.

5. An atomic oscillator comprising:
a static magnetic field applying structure for applying a static magnetic field to a resonance cell which hermetically encloses therein a predetermined kind of atoms, wherein said structure comprises:
plural sets of magnetic field generating means which are capable of generating variable magnetic fields and are electrically independently provided with spacing interposed among them,
said resonance structure is disposed in a space between said magnetic field generating means, and
said static magnetic field generating means is composed of at least a couple of ring-like conductive patterns having a circular or polygonal shape with a partial cut-away portion, said ring-like conductive patterns being provided on said resonance cell itself so that magnetic fluxes having the same direction can be generated in response to direct currents flowing through said conductive patterns, whereby a static magnetic field is created in a space sandwiched between said ring-like conductive patterns.

6. A static magnetic field applying structure for use in an atomic oscillator according to claim 1, wherein said atoms are rubidium atoms.

7. A static magnetic field applying structure for use in an atomic oscillator according to claim 2, wherein said atoms are rubidium atoms.

8. A static magnetic field applying structure for use in an atomic oscillator according to claim 3, wherein said atoms are rubidium atoms.

9. A static magnetic field applying structure for use in an atomic oscillator according to claim 4, wherein said atoms are rubidium atoms.

10. A static magnetic field applying structure for use in an atomic oscillator according to claim 5, wherein said atoms are rubidium atoms.

11. An atomic oscillator comprising:
a static magnetic field applying structure for applying a static magnetic field to a resonance cell which hermetically encloses therein a predetermined kind of atoms, wherein said structure comprises:
a metal rod being shaped to have first and second antenna portions and plural solenoid coils wound around said metal rod are provided as magnetic field generating means;
said magnetic field generating means comprising:
a first magnetic field generating unit and a second magnetic field generating unit which are capable of generating variable magnetic fields and are electrically independently provided with spacing interposed among them, and opposed to each other so that the magnetic fluxes having the same direction can be generated in said first magnetic field generating unit and said second magnetic field generating unit, and said resonance cell is disposed in a space sandwiched between said antenna portions of said metal rod and between said first magnetic field generating unit and said second magnetic field generating unit.

12. An atomic oscillator comprising:

a static magnetic field applying structure for applying a static magnetic field to a resonance cell which hermetically encloses therein a predetermined kind of atoms, wherein said structure comprises:

a metal rod being shaped to have first and second antenna portions and a solenoid coil wound around said metal rod are provided as magnetic field generating means, wherein said magnetic field generating means is composed of a straight conductive pattern formed within an inner layer of a multiple printed board and serving as said metal rod, a coil-like circuit composed of a plural number of conductor pattern pieces formed on layers sandwiching said inner layer from both the sides thereof and via holes connecting any couple of said conductor pattern pieces to each other so that said conductor pattern pieces and said via holes collectively constitute and serve as a solenoid coil surrounding said straight conductive pattern, and antenna members serving as the antenna portions provided at both the ends of said straight conductive pattern so that a magnetic flux is released from the antenna members and a static magnetic field can be created in a space between said antenna members, and said resonance cell is provided in said space between the antenna portions of said metal rod.

13. A static magnetic field applying structure for use in an atomic oscillator according to claim 12, wherein a plurality of straight conductive patterns are provided in parallel on said inner layer, said antenna members are provided for each straight conductive pattern at both the ends thereof, and said coil-like circuit is formed so as to surround the straight conductive patterns collectively.

14. A static magnetic field applying structure for use in an atomic oscillator according to claim 11, wherein said atoms are rubidium atoms.

15. A static magnetic field applying structure for use in an atomic oscillator according to claim 12, wherein said atoms are rubidium atoms.

16. A static magnetic field applying structure for use in an atomic oscillator according to claim 13, wherein said atoms are rubidium atoms.

* * * * *